United States Patent [19]

Lesieur

[11] Patent Number: 5,733,347
[45] Date of Patent: Mar. 31, 1998

[54] COMPACT FUEL GAS REFORMER ASSEMBLAGE

[75] Inventor: Roger R. Lesieur, Enfield, Conn.

[73] Assignee: International Fuel Cells Corp., South Windsor, Conn.

[21] Appl. No.: 579,510

[22] Filed: Dec. 27, 1995

[51] Int. Cl.[6] .................................................. B01J 7/00
[52] U.S. Cl. .......................... 48/61; 48/94; 48/127.7; 48/198.8; 422/191; 422/203
[58] Field of Search ............... 48/61.94, 127.7, 48/127.9, 198.8; 472/191, 203

[56] References Cited

U.S. PATENT DOCUMENTS

| 4,098,578 | 7/1978 | Krar et al. | 48/94 |
| 4,203,950 | 5/1980 | Sederquist | 48/94 |
| 4,690,690 | 9/1987 | Andrew et al. | 422/203 |
| 4,714,593 | 12/1987 | Akio et al. | 422/197 |
| 4,849,187 | 7/1989 | Hisahiro | 422/197 |
| 4,861,348 | 8/1989 | Koyama et al. | 422/203 |
| 4,935,037 | 6/1990 | Koyama et al. | 48/94 |
| 5,219,535 | 6/1993 | Francesco et al. | 422/201 |

FOREIGN PATENT DOCUMENTS

| 0079423 | 5/1983 | European Pat. Off. |
| 0305203 | 3/1989 | European Pat. Off. |
| 0430184 | 6/1992 | European Pat. Off. |
| 0195688 | 9/1996 | European Pat. Off. |
| 2057908 | 4/1981 | United Kingdom |

OTHER PUBLICATIONS

Pat Abs. of Japan vol. 13, No. 119, Nov. 29, 1988.

Primary Examiner—Timothy McMahon
Attorney, Agent, or Firm—William W. Jones

[57] ABSTRACT

A fuel gas reformer assemblage for use in a fuel cell power plant is formed from a composite plate assembly which includes spaced-apart divider plates with interposed columns of individual gas passages. The reformer assemblage is constructed from a series of repeating sub-assemblies, each of which includes a core of separate regenerator/heat exchanger gas passages. The core in each sub-assembly is sandwiched between a pair of reformer gas passage skins, which complete the sub-assembly. Adjacent reformer gas/regenerator/reformer gas passage sub-assemblies in the composite plate assembly are separated from each other by burner gas passages. The regenerator/heat exchanger gas passages and the reformer gas passages in each sub-assembly are connected by gas flow return manifolds which form a part of each sub-assembly. The fuel gases flow in one end of the assemblage, through the reformer gas passages, and then reverse their direction of flow in the return manifolds so as to exit the reformer assemblage through the regenerator gas flow passages. The burner gases flow in one end of the reformer assemblage and out the other end. The walls of the burner and reformer gas flow passages are selectively catalyzed after the assemblage has been constructed.

10 Claims, 3 Drawing Sheets 5,733,347

COMPACT FUEL GAS REFORMER ASSEMBLAGE

DESCRIPTION

1. Technical Field

This invention relates to a fuel gas steam reformer assemblage which is formed from a plurality of repeating subassemblies. More particularly, this invention relates to a fuel gas steam reformer assemblage which is compact and lighter in weight than conventional steam reformer assemblages used in fuel cell power plants.

2. Background

Fuel cell power plants include fuel gas steam reformers which are operable to catalytically convert a fuel gas, such as natural gas, into hydrogen and carbon dioxide. The conversion involves passing a mixture of the fuel gas and steam through a catalytic bed which is heated to a reforming temperature of about 1,250° F. to about 1,600° F. Catalysts typically used are nickel catalysts which are deposited on alumina pellets. A typical reformer will consist of a plurality of reaction tubes which are contained in a housing that is insulated for heat retention. The reaction tubes are heated by burning excess fuel gas in the housing and passing the burner gasses over the reaction tubes. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas-steam mixture flows through the catalyst beds. The resultant heated hydrogen and carbon dioxide gas mixture then flows through the central exhaust passages in each tube so as to assist in heating the inner portions of each of the annular catalyst beds; and thence from the reformer for further processing and utilization.

Steam reformers require a large amount of surface area in the catalyst bed in order to provide a high degree of catalyst-fuel mixture interaction and a large heat transfer surface area to produce the amount of hydrogen required to operate the fuel cells at peak efficiency. This need for large catalyst bed and heat transfer surface area, when met by using catalyst-coated pellets in tubular reformers, results in undesirably large and heavy reformer assemblies. For example, a commercially available 200 KW acid fuel cell power plant includes a steam reformer component which has a volume of about 150 to 175 cubic feet; and weighs about 3,500 lbs. It would be highly desirable to provide a steam reformer which is suitable for use in a fuel cell power plant, which reformer supplies the necessary surface areas, but is compact and light in weight.

DISCLOSURE OF THE INVENTION

This invention relates to a steam reformer structure which provides the necessary catalyzed and heat transfer surface area, is substantially smaller and lighter than presently available steam reformers, and can be operated at lower service temperatures. The steam reformer structure of this invention is formed from a series of essentially flat plate reformer components. Each of the reformer components includes outer reformer passages sandwiched around a plurality of central regenerator/heat exchanger passages. At a first end of the component, the reformer passages are connected to a fuel-steam manifold which feeds the fuel-steam mixture into the reformer passages. The opposite end of each component is provided with a flow reversal manifold that directs the fuel gas-steam mixture emanating from the outer reformer passages back into the central regenerator/heat exchanger passages. A reformer exit manifold is also disposed at the first end of each component to direct the reformed gas stream to the next fuel processing station in the power plant. Adjacent reformer components are separated from each other by burner gas passage plates through which the reformer burner gases flow. Thus, each of the reformer passage plate units is disposed directly adjacent to a burner passage plate unit, and the adjacent reformer and burner passages share a common wall.

The flat plate components of the steam reformer assembly may be formed from planar metal sheets which are separated from each other by corrugated metal sheets. The corrugated sheets provide the high surface area needed to properly reform the fuel gas. All of the metal sheets which make up the flat plate reformer and burner components of the assemblage have both surfaces covered with a catalyzed alumina coating. The surfaces to be catalyzed will be primed by means of a conventional wash coating process such as that provided by W. R. Grace and Co. The wash coating process is presently used to produce automobile catalytic converters, wood stove catalytic emission units, and the like. The metal plates used to form the flat plate components are steel alloy plates containing aluminum which can be brazed or spot welded together; surface oxidized; wash coated; and then selectively coated with the catalyst. By catalyzing the reformer and burner passage heat transfer walls in the assemblage, operating temperatures of the reformer assemblage can be kept at a minimum. The use of the flat plate construction, with its maximized surface area, allows minimization of the reformer size and weight. The walls of the regenerator heat exchanger passages are not catalyzed, although they may be provided with the wash coat primer layer.

It is therefore an object of this invention to provide an improved steam reformer assembly which reformer assembly is compact and lightweight.

It is a further object of this invention to provide a reformer assembly of the character described which operates at lower temperatures than presently available reformer assemblies.

It is another object of this invention to provide a reformer assembly of the character described which is inexpensive to manufacture as compared to commercially available steam reformers.

These and other objects and advantages of this invention will become readily apparent to one skilled in the art from the following detailed description of a preferred embodiment of the invention when taken in conjunction with the accompanying drawings in which:

BEST MODE FOR CARRYING OUT THIS INVENTION

Figure 1:
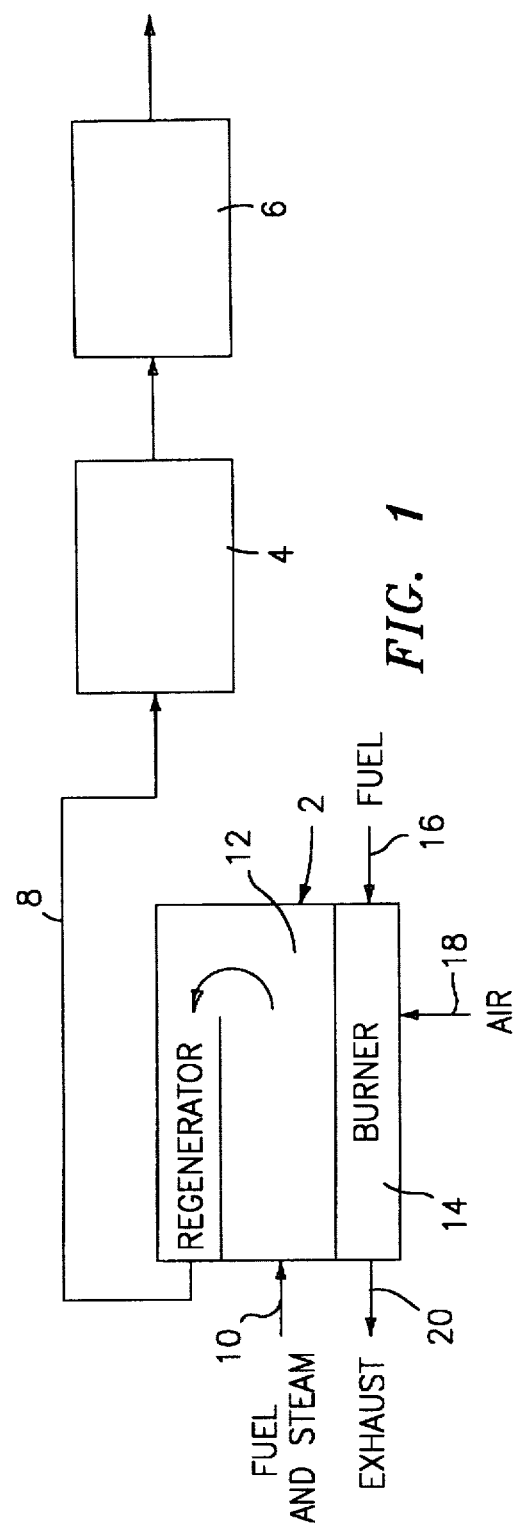
FIG. 1 is a schematic view of a fuel processor assembly which forms a portion of the fuel cell power plant.

Referring now to the drawings, there is shown in FIG. 1 a schematic view of a fuel processing assembly which forms a portion of a typical fuel cell power plant. The fuel processing assembly includes a fuel steam reformer regenerator station 2; a shift converter station 4; and a selective oxidizer station 6 which may be required for certain fuel cells that are intolerant to high levels of carbon monoxide. The reformer/regenerator 2 is connected to a shift converter 4 by means of a line 8. The reformer/generator station 2 includes a fuel and steam inlet line 10 which feeds the fuel/steam mixture into the catalyzed reformer zone 12. A mixture of partially spent fuel from the fuel cell stack, and air, is fed into a burner component 14 via lines 16 and 18, and combusted therein to heat the fuel/steam mixture to reacting temperatures. The burner 14 is exhausted from the reformer/regenerator 2 via line 20.

Figure 2:
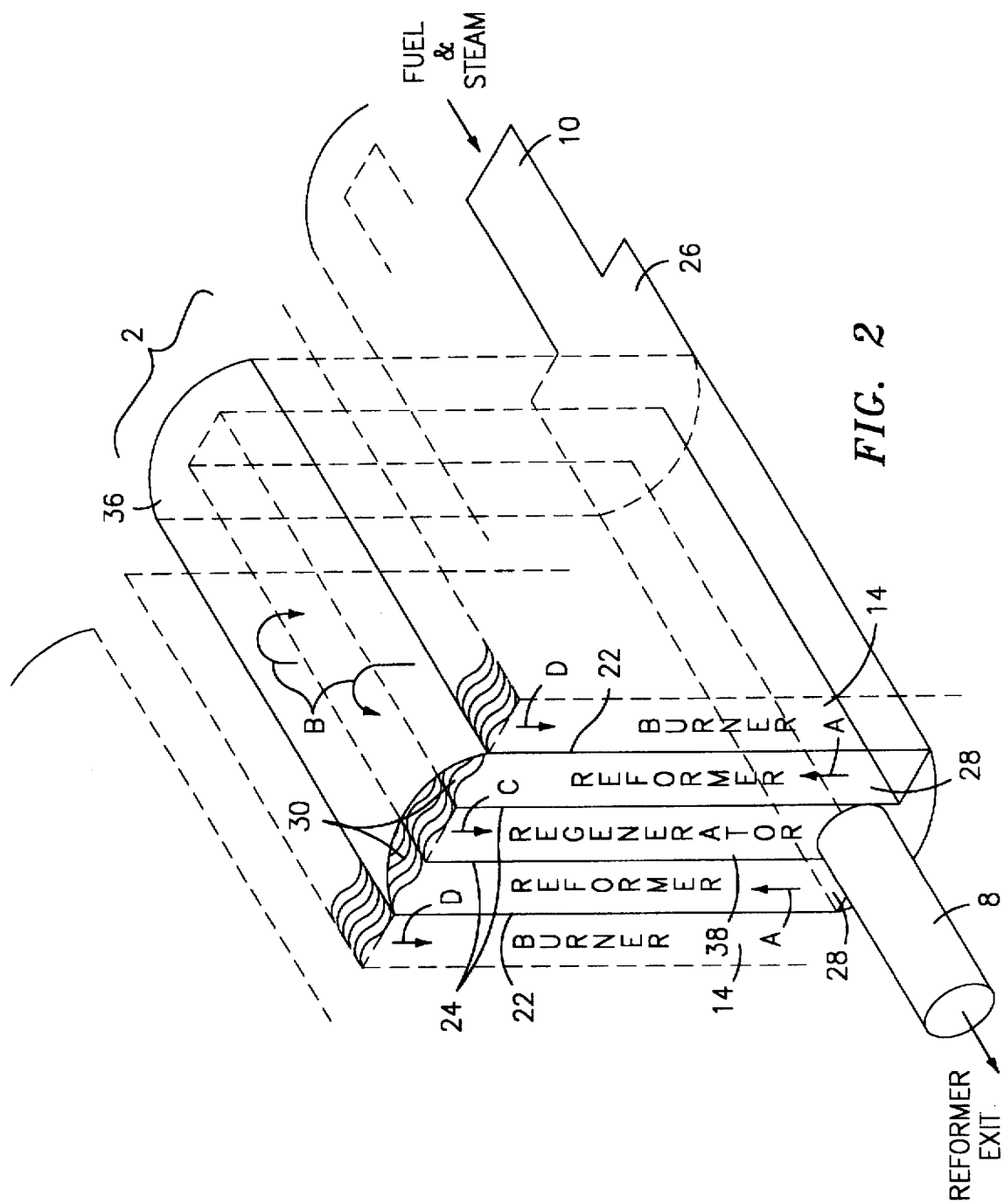
FIG. 2 is a schematic, fragmented perspective view of a single reformer unit component of a reformer assembly formed in accordance with this invention.
Figure 3:
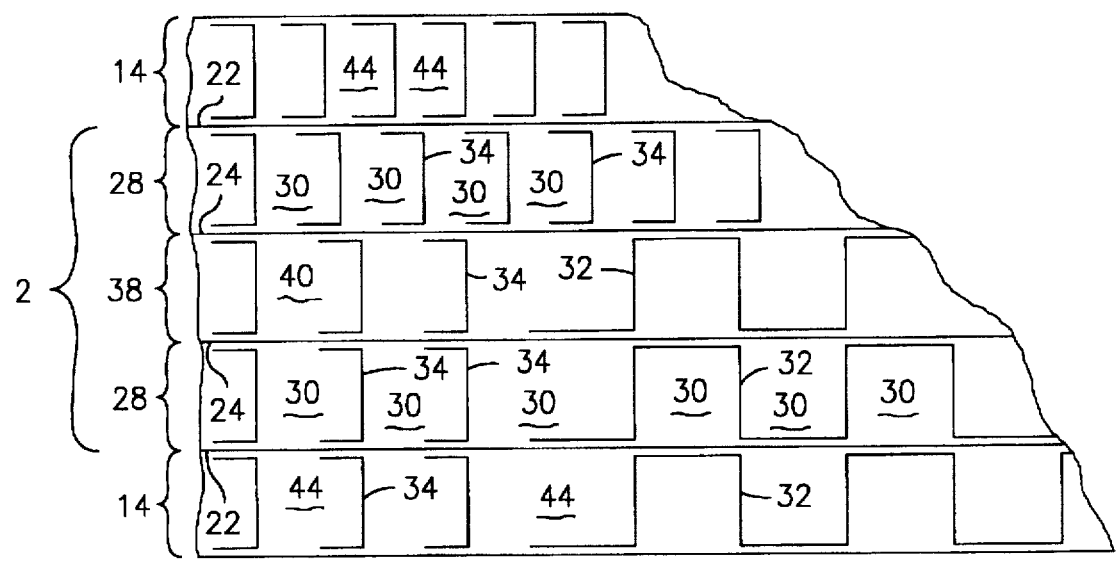
FIG. 3 is a fragmented end view of a reformer/regenerator/burner component formed in accordance with this invention.

FIGS. 2 and 3 show schematically an embodiment of a reformer/regenerator component 2 which is formed in accordance with this invention. The reformer/regenerator component 2 includes a pair of outer spaced apart planar wall members 22, and a pair of inner spaced apart planar wall members 24. The reformer/regenerator component 2 includes a fuel and steam mixture inlet line 10 which leads to a manifold 26 that opens into the reformer sections 28 of the component 2. The reformer sections 28 are disposed between the planar wall members 22 and 24 each of the reformer sections 28 includes a plurality of side-by-side passages 30 which are shown most clearly in FIG. 3. The reformer passages 30 can be formed by a corrugated panel 32, or by individual U-shaped strips 34 which are sandwiched between and secured to the planar wall members 22 and 24. The fuel and steam mixture flows from the manifold 26 through the passages 30 to a flow reversal manifold 36, as indicated by arrows A in FIG. 2. The mixture then reverses its direction of flow, as indicated by arrows B, and passes into the central regenerator/heat exchanger section 38 of the component 2. The regenerator/heat exchanger section 38 includes a plurality of side-by-side passages 40 which may be formed by a corrugated panel 32 or by U-shaped strips 34, as shown in FIG. 3. The gas stream flows through the regenerator/heat exchanger section 38 of the component 2, as indicated by arrow C, and into the reformer exit line 8. The component 2 is flanked by burner gas sections 14 which include through passages 44 that may be formed by a corrugated panel 32 or U-shaped strips 34. Hot burner gases flow through the burner passages 44 as indicated by arrows D.

The reformer assembly is composed of an appropriate number of the above-described components 22 positioned side-by-side, and separated from each other by burner gas sections 14. The outer walls 22 of the reformer sections 28 are heated by the burner gas sections 14, and the inner walls 24 of the reformer sections 28 are heated by the hot reformer effluent gas stream flowing through the regenerator/heat exchanger section 38.

As previously noted, the metal components of the reformer, regenerator/heat exchanger and burner sections are preferably formed from a steel based alloy containing aluminum. The planar walls, corrugated panels and/or the U-shaped strips are assembled by brazing or welding the assembly. The assembly is then heat treated to generate a surface coating of aluminum oxide on all of the exposed surfaces in the reformer, regenerator, and burner sections. A wash coating primer is then applied to at least the surfaces to be catalyzed. The was coating can be applied to all of the exposed surfaces of the assemblage if so desired. The catalyzed alumina coating is then applied to the wash coated surfaces of the burner and reformer passages.

Figure 4:
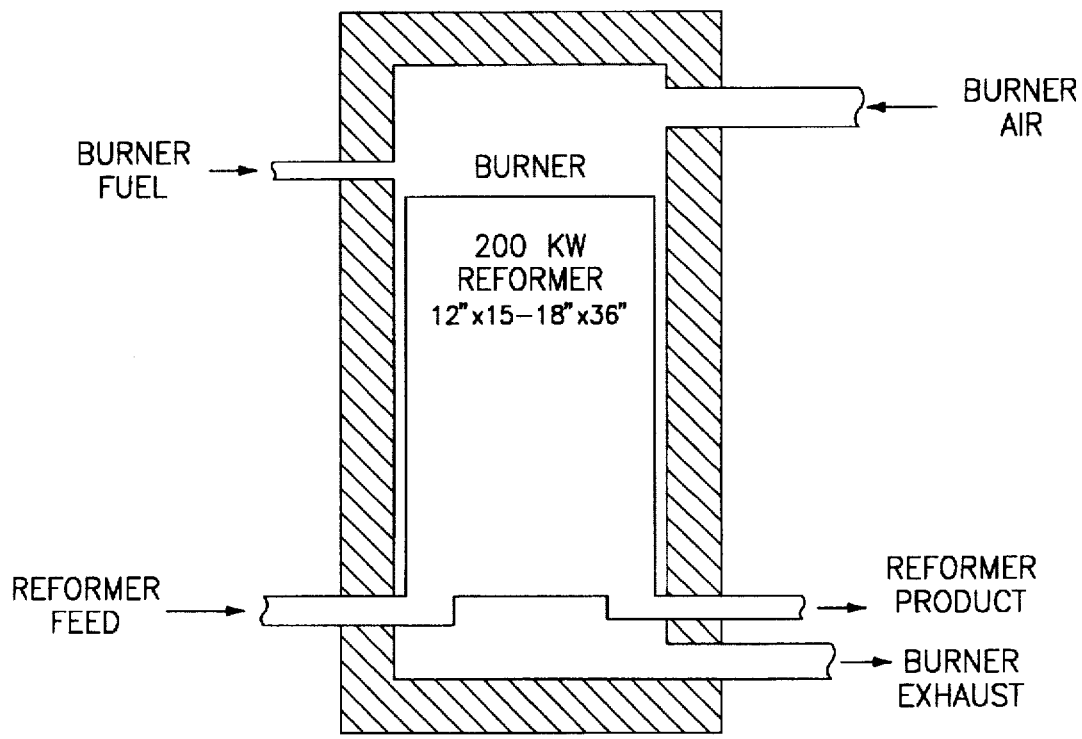
FIG. 4 is a schematic sectional view of a compact steam reformer formed in accordance with this invention.

Referring now to FIG. 4, there is shown schematically a steam reformer assembly for use in a 200 KW fuel cell power plant. The reformer assembly 2 is encased in an insulated housing 46. The burner fuel and burner air lines 16 and 18 enter the top of the housing 46, and burner exhaust gases are removed through an exhaust line 20 at the bottom of the housing 46. The reformer components 2 are disposed in the housing 46; the fuel/steam gas mixture is fed into the reformer components 2 via line 10 at the bottom of the housing 46; and the reformed gas is removed from the housing 46 via line 8.

The use of the plate construction with outer planar parts and inner separate passages results in a lightweight, strong steam reformer assembly which provides large surface area per unit volume. The aforesaid plate construction can be used with advantage in connection with steam reformers in a fuel cell power plant, or with stand alone steam reformers of the type shown in U.S. Pat. No. 4,098,587, granted Jul. 4, 1978 to O. L. Olesen et al, and others. All surfaces of the reformer and burner sections of the reformer assembly can be catalyzed after wash coating the assembled reformer. Alternatively, the wash coating and catalyzing processes can be combined into a single step. The fact that the heated sections of the assembly share common walls with the reformer sections allows the reformer walls to be operated at lower temperatures than the currently available catalyzed pellet-type reformers. The weight and size savings achieved by using the plate-type construction described above is enhanced with larger higher power output fuel cell power plants, or stand-alone reformers.

Since many changes and variations of the disclosed embodiment of the invention may be made without departing from the inventive concept, it is not intended to limit the invention other than as required by the appended claims.

What is claimed is:

1. A hydrocarbon fuel gas steam reformer assembly comprising:

a) an inlet manifold for directing a mixture of the fuel gas and steam into the assembly;

b) a reformer section connected to said inlet manifold so as to receive a stream of the fuel gas and steam mixture, said reformer section being formed from first and second spaced-apart plates with a plurality of separate reformer gas passages sandwiched between said first and second plates;

c) a regenerator-heat exchanger section adjacent to said reformer section, said regenerator-heat exchanger section being formed from said first plate and a third plate which is spaced-apart from said first plate on a side thereof opposite said second plate, said regenerator-heat exchanger section further including a plurality of separate regenerator-heat exchanger gas passages sandwiched between said first and third plates, said first plate providing heat transfer from gas flowing through said regenerator-heat exchanger gas passages to gas flowing through said reformer gas passages, walls of said reformer gas passages being covered with a catalyzed alumina coating;

d) a burner gas section adjacent to said reformer section on a side of said reformer section opposite to said regenerator-heat exchanger section, said burner gas section being formed from said second plate and a fourth plate, which fourth plate is spaced-apart from said second plate, said burner gas section further including a plurality of separate burner gas passages sandwiched between said second and fourth plates, said second plate providing heat transfer from burner gases flowing through said burner gas passages to gases flowing through said reformer gas passages;

e) a gas flow-reversing manifold connecting said reformer gas passages with said regenerator-heat exchanger gas passages, said gas flow-reversing manifold being operable to direct a gas stream exiting from said reformer section into said regenerator-heat exchanger section; and f) an outlet manifold connected to said regenerator-heat exchanger section for removing reformed fuel gas from the assembly.

2. The fuel gas steam reformer assembly of claim 1, wherein walls of said burner gas passages are covered with a catalyzed alumina coating.

3. The fuel gas steam reformer assembly of claim 2, wherein said reformer gas passages are formed by a first corrugated sheet adhered to said first and second plates.

4. The fuel gas steam reformer assembly of claim 3, wherein said regenerator-heat exchanger gas passages are formed by a second corrugated sheet adhered to said first and third plates.

5. The fuel gas steam reformer assembly of claim 4, wherein said burner gas passages are formed by a third corrugated sheet adhered to said second and fourth plates.

6. A hydrocarbon fuel gas steam reformer assembly comprising: a regenerator-heat exchanger gas section; a reformer gas section; and a burner gas section; said regenerator-heat exchanger gas section and said burner gas section being sandwiched around said reformer gas section, said reformer gas section sharing a first common flat heat transfer wall with said regenerator-heat exchanger gas section and sharing a second common flat heat transfer wall with said burner gas section, each of said gas sections including a plurality of adjacent separate gas flow passages formed by dividers fixed to said heat transfer walls, the gas flow passages in said burner and reformer sections being coated with a catalyzed alumina coating; an inlet manifold operably connected to said reformer gas section for introducing a fuel gas-steam mixture into said reformer gas passages; a flow reversal manifold operably interconnecting said reformer section with said regenerator-heat exchanger section for transferring reformed gas from said reformer gas passages to said regenerator-heat exchanger gas passages; and an outlet manifold operably connected to said regenerator-heat exchanger section for withdrawing reformed gas from said assembly.

7. The fuel gas reformer assembly of claim 6 wherein said dividers are formed by corrugated sheets affixed to said heat transfer walls.

8. A hydrocarbon fuel gas steam reformer assembly comprising: a central regenerator-heat exchanger gas section; a first reformer gas section disposed on one side of said regenerator-heat exchanger gas section, and second reformer gas section disposed on an opposite side of said regenerator-heat exchanger gas section; a first burner gas section disposed on an outer side of said first reformer gas section, and a second burner gas section disposed on an outer side of said second reformer gas section; said reformer gas sections sharing common flat heat transfer walls with said regenerator-heat exchanger gas section, and also sharing common flat heat transfer walls with said burner gas sections, each of said gas sections including a plurality of adjacent separate gas flow passages formed by dividers fixed to said heat transfer walls, the gas flow passages in said burner and reformer sections being coated with a catalyzed/ alumina coating; an inlet manifold operably connected to said reformer gas sections for introducing a fuel gas-steam mixture into said reformer gas passages; a flow reversal manifold operably interconnecting said reformer sections with said regenerator-heat exchanger section for transferring reformed gas from said reformer gas passages to said regenerator-heat exchanger gas passages; and an outlet manifold operably connected to said regenerator-heat exchanger section for withdrawing reformed gas from said assembly.

9. The fuel gas reformer assembly of claim 8 wherein said dividers are formed by corrugated sheets affixed to said heat transfer walls.

10. The fuel gas reformer assembly of claim 8 herein said dividers are formed by U-shaped strips affixed to said heat transfer-walls.

* * * * *